United States Patent [19]

Ito

[11] Patent Number: 4,668,116

[45] Date of Patent: May 26, 1987

[54] CONNECTING STRUCTURE OF FLYWHEEL TO CRANKSHAFT

[75] Inventor: Toshifumi Ito, Tokorozawa, Japan

[73] Assignee: Honda Giken Kogyo Kabushiki Kaisha, Tokyo, Japan

[21] Appl. No.: 790,411

[22] Filed: Oct. 23, 1985

[30] Foreign Application Priority Data

Oct. 29, 1984 [JP] Japan .............................. 59-225947

[51] Int. Cl.$^4$ ........................... F16B 2/02; F16D 1/06
[52] U.S. Cl. .................................... 403/258; 403/290; 403/359; 403/371; 403/374
[58] Field of Search ............... 403/290, 373, 374, 370, 403/371, 258, 259, 261, 365, 359

[56] References Cited

U.S. PATENT DOCUMENTS

| | | | |
|---|---|---|---|
| 857,862 | 6/1907 | Best | 403/290 |
| 2,443,688 | 6/1948 | McFarland | 403/359 |
| 3,021,049 | 2/1962 | Settle | 403/290 |
| 3,596,943 | 8/1971 | Krauss | 403/370 |
| 4,022,536 | 5/1977 | Piepho et al. | 403/371 |
| 4,115,022 | 9/1978 | Orain | 403/359 |
| 4,142,811 | 3/1979 | Burnham | 403/290 |

Primary Examiner—Cornelius J. Husar
Assistant Examiner—Peter M. Cuomo
Attorney, Agent, or Firm—Frishauf, Holtz, Goodman & Woodward

[57] ABSTRACT

In a combustion engine, a flywheel is coupled to a crankshaft, the flywheel and crankshaft being in splined engagement. To eliminate play between the flywheel and crankshaft which occurs under conditions of torque fluctuation due to clearance between the meshing teeth, a deformable member is provided to reduce this clearance. The deformable member includes a bore with teeth therein also in mesh with the crankshaft teeth. In one embodiment, the deformable member is a hub on the flywheel compressed by an element movable against it by a bolt. Opposed tapered surfaces compress the deformable member as the bolt is tightened. In another embodiment, the deformable member is a separate element and is tapered and fits within a tapered inner surface on the bore of the flywheel. As the deformable member is pressed against the flywheel by the bolt, it is simultaneously compressed by the action of the opposed tapered surfaces.

21 Claims, 7 Drawing Figures

CONNECTING STRUCTURE OF FLYWHEEL TO CRANKSHAFT

FIELD OF THE INVENTION

The present invention relates to a connecting structure for connecting a flywheel to a crankshaft in a combustion engine.

BACKGROUND OF THE INVENTION

An engine designed to be mounted on a large-size motorcycle has a large displacement per each cylinder, particularly in the case of a single or two cylinder engine. In such engines, a fluctuation in torque of a crankshaft due to an explosion load per each cylinder is great. In order to avoid applying an impact load due to the torque fluctuation to a transmission mechanism, it has been proposed to increase the mass of the flywheel connected to the crankshaft to suppress the rotation speed variation thereof.

Known connections, or couplings, between the flywheel and the crankshaft are, in general, constructed such that an outer peripheral surface of one end of the crankshaft is tapered so as to form a tapered shaft, an inner surface of a bore in the flywheel fitted on the tapered shaft is formed into a tapered surface, the crankshaft and the flywheel are wedge-engaged with each other by both the tapered surfaces, and the flywheel is fastened to the crankshaft by a bolt. As the tightening force on the bolt is increased, the flywheel and crankshaft will become more firmly wedged together. If the two are tightly wedged, then the flywheel will effectively absorb the above mentioned impact loads. However, because the tightening torque which can be applied to the bolt is limited, it imposes a restriction on the flywheel mass and/or engine size for which this approach is useful. In this connection, the greater the flywheel mass the higher the torque for tightening the flywheel is required. In practice, however, the tightening torque has a limit. In view of the above, another approach is used when a flywheel having a great mass is required. The flywheel is brought into spline engagement with the crankshaft. In this arrangement, however, some circumferential play exists between the flywheel and crankshaft due to a clearance between meshed teeth at the spline engagement. Consequently, torque fluctuation on the crankshaft imparts an impact load to each tooth at the spline engagement which develops high stress. This may result in the shortening of the torsional fatique life of the crankshaft. In addition, the spline clearance allows the tightened end face of the assembly to move slightly, and this is adequate to cause wear at that spot sufficient to reduce the tightening torque on the bolt.

OBJECT AND SUMMARY OF THE INVENTION

An object of the present invention is to provide a coupling between a flywheel and a crankshaft which minimizes the circumferential clearance between meshed teeth at a spline engagement between the flywheel and the crankshaft to relieve an impact load resulting from a fluctuation in torque of the crankshaft and to, thereby, provide an engine having a long service life.

These and other objects of the invention are accomplished by an apparatus coupling the flywheel to the crankshaft by means of a spline engagement. The meshed teeth have a clearance therebetween. However, a deformable member is provided to release this clearance between meshed teeth. The deformable member includes a bore for receiving the crankshaft therein. Also included in the bore are teeth in mesh with the crankshaft teeth. Means are provided to radially compress the member so that its teeth are brought toward the crankshaft teeth to minimize the play between the flywheel and crankshaft. In one specific embodiment, the deformable member is a hub on the flywheel. A tapered surface on the hub is adapted to fit against a tapered surface on a connecting member which is forcibly movable against the hub by a bolt. In another embodiment, the deformable member is a separate element having a tapered outer surface which fits within the inner bore of the flywheel against a suitably tapered surface on the flywheel. In both approaches, as the tapered surfaces slide against each other while the bolt is being tightened, the deformable member is compressed radially.

DETAILED DESCRIPTION OF THE PREFERRED EMBODIMENTS

Figure 1:
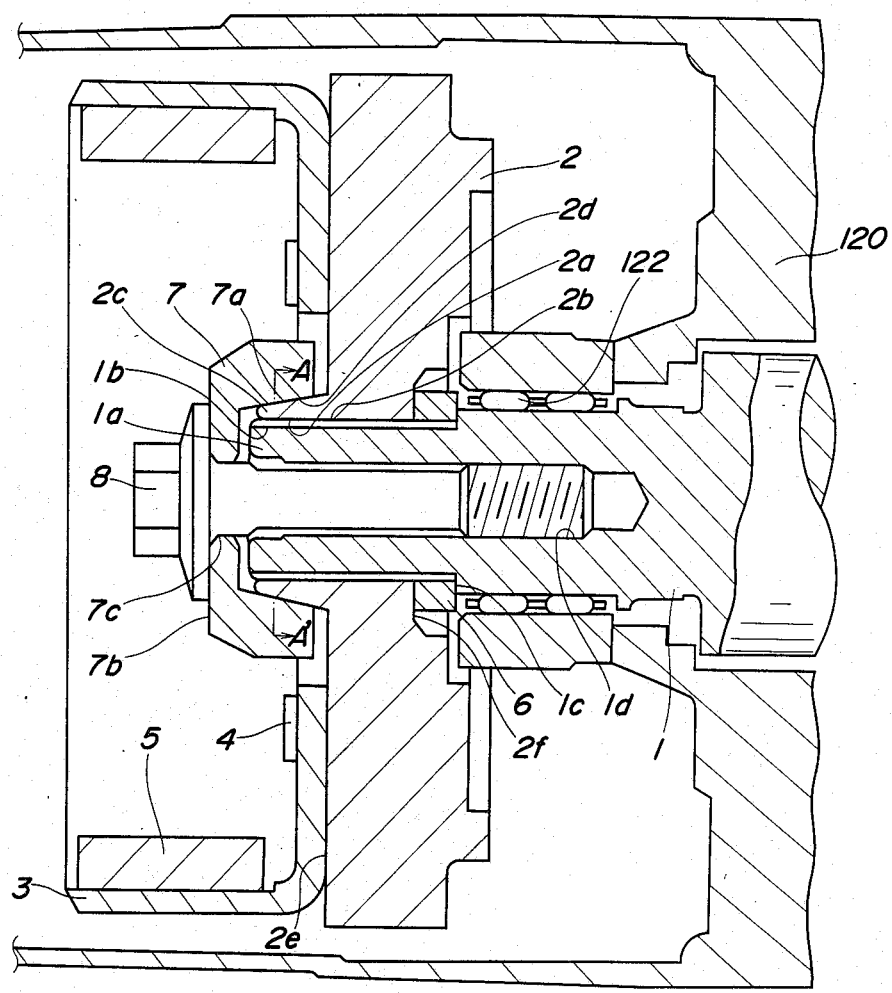
FIG. 1 is a cross-sectional view of structure connecting a flywheel to a crankshaft in accordance with a first embodiment of the invention.

The present invention will now be described, by way of an example, with reference to the accompanying drawings. FIG. 1 illustrates a principal portion of a connecting structure of a flywheel to a crankshaft, to which the present invention is applied. The crankshaft 1 has one end 1a journaled in bearing housing 120 having roller bearings 122. This arrangement is conventional and well known, and the inclusion of additional details is not deemed necessary. End 1a has formed on an outer circumferential surface thereof axially extending teeth 1b circumferentially equidistantly spaced from each other. The flywheel 2 has a central bore 2a which has formed on an inner circumferential surface thereof teeth 2b in mesh with the teeth 1b on the crankshaft 1. Crankshaft 1 and the flywheel 2 are, thus, in spline engagement with each other through the teeth 1b and 2b. With this spline engagement, as indicated by the solid line in FIG. 2, a circumferential clearance is left between each tooth 1b on the crankshaft and the corresponding tooth 2b on the flywheel 2. A peripheral edge portion around one open end of the central bore 2a in the flywheel 2 extends axially in a manner of flange to form a hub 2c which has an outer peripheral surface thereof gradually reduced in diameter toward the one open end to form a tapered surface 2d. The flywheel 2 has an outer end face 2e to which an end face of a rotor 3 of an alternator is secured by means of screws 4. The rotor 3 is generally in the form of a cup and has an inner circumferential surface to which a plurality of magnets 5 are secured in circumferentially spaced relation to each other at a predetermined interval.

The flywheel 2 is, as shown in FIG. 1, fitted on the one end 1a of the crankshaft 1 with a collar 6 being located between a step 1c on the crankshaft 1 and edge portion 2f of a step on the inner open end of bore 2 in the flywheel 2.

A connecting member 7 is generally in the form of a cup having a thick wall. An inner surface of the wall diverges toward an open end to form a tapered surface 7a which is set so as to be capable of being brought into slidable contact with tapered surface 2d of hub 2c on flywheel 2. Connecting member 7 has an end face 7b having at its center a bore 7c for receiving therein a bolt 8. The connecting member 7 is formed of a material such as iron or the like. Connecting member 7 is, as shown in FIG. 1, fitted on the hub 2c of the flywheel 2 with tapered surface 7a being brought into circumferential contact with tapered surface 2d. Bolt 8 extends through the bore 7c in the connecting member 7 and threadedly engages a threaded bore 1d provided in the crankshaft 1. The tightening of bolt 8 causes the tapered surface 7a of the connecting member 7 to apply pressure on tapered surface 2d of hub 2c on the flywheel 2 to, thereby, decrease the diameter of the hub 2c radially inwardly. This causes the hub 2c of the flywheel 2 to be distorted to a position 2b' indicated by the broken line in FIG. 2, to decrease the clearance between each tooth; 1b on the crankshaft 1 and the corresponding tooth 2b on the flywheel 2 to substantially zero. Thus, circumferential play between flywheel 2 and crankshaft 1 is eliminated so that an impact load on the spline engagement resulting from the great fluctuation in torque of the crankshaft 1 and the great inertia mass of flywheel 2 would be substantially eliminated to correspondingly improve the durability of an engine.

Figure 3:
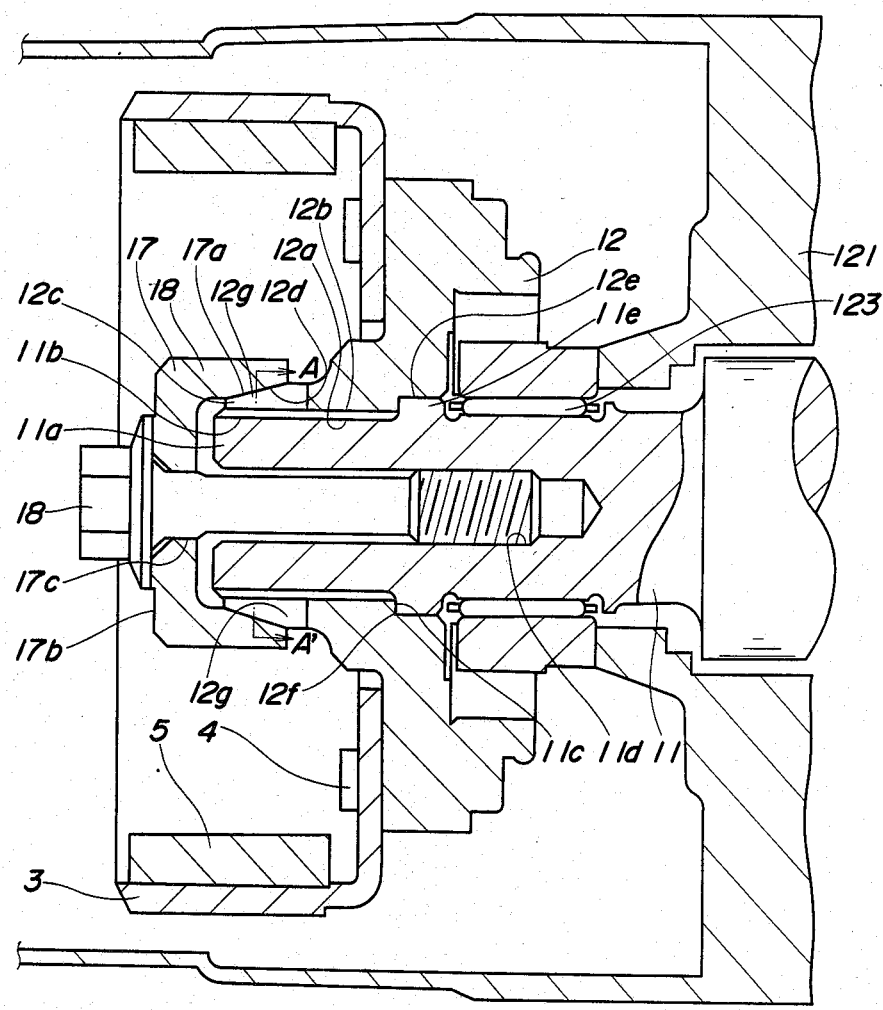
FIG. 3 is a view similar to FIG. 1, but showing a second embodiment of the invention.

FIG. 3 illustrates another embodiment of the invention. As in the previous embodiment, outwardly radially extending teeth 11b on end 11a of crankshaft 11 are in spline engagement with inwardly radially extending teeth 12b on the flywheel 12. Crankshaft 11 is journaled into bearing housing 121 having bearings 123. Four slits 12g are formed in hub 12c of flywheel 12. Slits 12g are circumferentially equidistantly spaced around hub 12c in order to facilitate the radial deformation of hub 12c. In addition, an annular projection 11e having a greater diameter is formed on one end 11a of crankshaft 11. Annular projection 11e is fitted in an inner circumferential surface 12e of a peripheral edge portion 12f around an inner open end of bore 12a in the flywheel 12. The outward play between flywheel 12 and crankshaft 11 is reduced by connecting member 17, and an inward play therebetween is substantially eliminated by the fitting of the annular projection 11e in the inner circumferential surface 12e.

Figure 2:
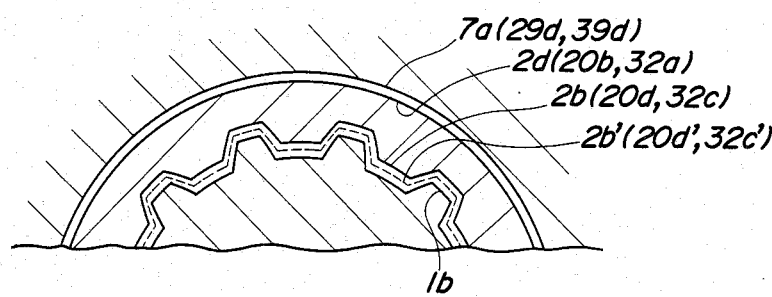
FIG. 2 is a cross-sectional view of a spline engagement in the connecting structure along line A—A' in FIGS. 1, 3, 4 and 6.
Figure 5:
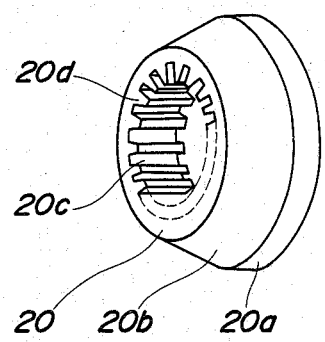
FIG. 5 is a perspective view of a connecting member from the third embodiment of the invention shown in FIG. 4.
Figure 4:
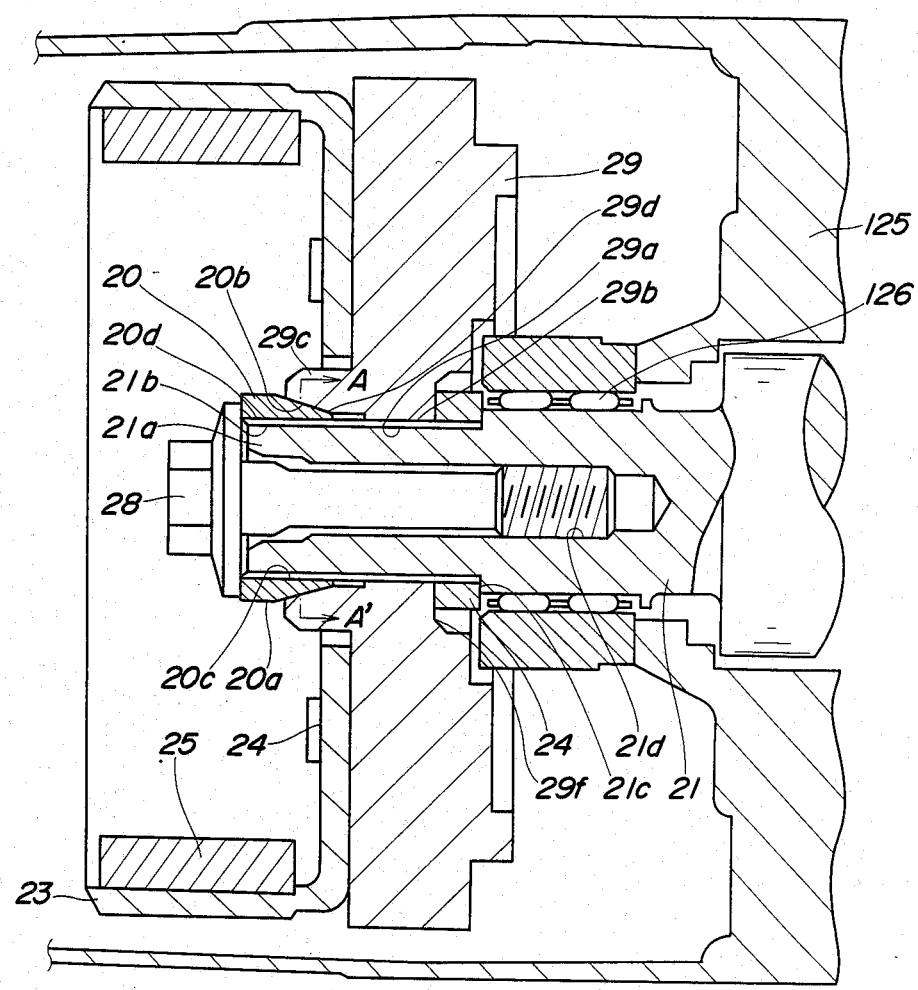
FIG. 4 is a view similar to FIG. 1, but showing a third embodiment of the present invention.

Connecting member 17 is cup-shaped with wall 18 and outer surface 17b. Wall 18 has an inner surface 17a tapered outwardly toward the open end of member 17. Hub 12c includes tapered surface 12d arranged to engage surface 17a of the connecting member. As bolt 18 is screwed into threaded opening 11d in the crankshaft it forces connecting member 17 against hub 12c of the crankshaft. At the same time, tapered surface 17a presses against tapered surface 12d to radially compress hub 12c. The relative position of the respective teeth on the flywheel and crankshaft is as shown in FIG. 2 for the first embodiment. Slits 12g, which can of course be more than four in number, facilitate the radial compression of hub 12c to eliminate play between the flywheel and crankshaft. FIG. 4 shows a further embodiment of the invention. The overall structure is similar to that shown in FIG. 1. Specifically, crankshaft 21 has one end 21a journaled in bearing housing 125 having roller bearings 126. End 21a of the crankshaft includes axially extending teeth 21b on its outer periphery. Flywheel 29 includes a bore 29a having teeth 29b therein. Teeth 29b are meshed with teeth 21b of the crankshaft. Collar 26 fits in recess 29f of flywheel 29 and is wedged in place between a wall of recess 29f and an increased diameter step 21c on crankshaft 21. Bore 29a in flywheel 29 has one open end shaped to define a hub 29c. The inner surface of hub 29c diverges outwardly to form a tapered surface 29d. A connecting member 20 has, as best shown in FIG. 5, an outer peripheral surface 20a which is gradually reduced in diameter toward one end of the connecting member 20 to form a tapered surface 20b which is adapted to be engageable with tapered surface 29d of flywheel 29. Connecting member 20 has therein a central bore 20c having formed on an inner circumferential surface thereof teeth 20d in mesh with teeth 21b on crankshaft 21.

Connecting member 20 is fitted on one end 21a of crankshaft 21 and is fitted in the tapered open end of flywheel 29. Flywheel 29 and connecting member 20 are secured to crankshaft 21 by means of bolt 28. The tightening of bolt 28 into threaded hole 21d of the crankshaft causes the tapered surface 20b of connecting member 20 to press against tapered surface 29d of flywheel 29 with the result that connecting member 20 is reduced in diameter by the reaction from tapered surface 29d. Consequently teeth 20d on connecting member 20 are distorted to a position 20d' indicated by the broken line in FIG. 2, similarly to the manner described above, to decrease the circumferential clearance between each tooth 20d on connecting member 20 and the corresponding tooth 21b on crankshaft 21 to substantially zero.

It should be apparent that some play exists between each tooth 29b on flywheel 29 and the corresponding tooth 21b on crankshaft 21 corresponding to the circumferential clearance between the teeth 29b and 21b. Flywheel 29 may consequently tend to be offset from tight splined connection between connecting 20 and crankshaft 21 by a play corresponding to the above-mentioned circumferential clearance. Nevertheless, the flywheel is substantially insulated from the impact due to torque variations on the crankshaft despite the play between it and the crankshaft. Because connecting member 20 and flywheel 29 are tightly wedged against each other at their respective tapered surfaces 20b and 29d, flywheel 29 is as tightly joined to the crankshaft as is the connecting member 20. Thus, the peripheral contact between tapered surface 20b and tapered surface 29d in effect serves as a brake to absorb shock due to the play between the flywheel and crankshaft.

Figure 6:
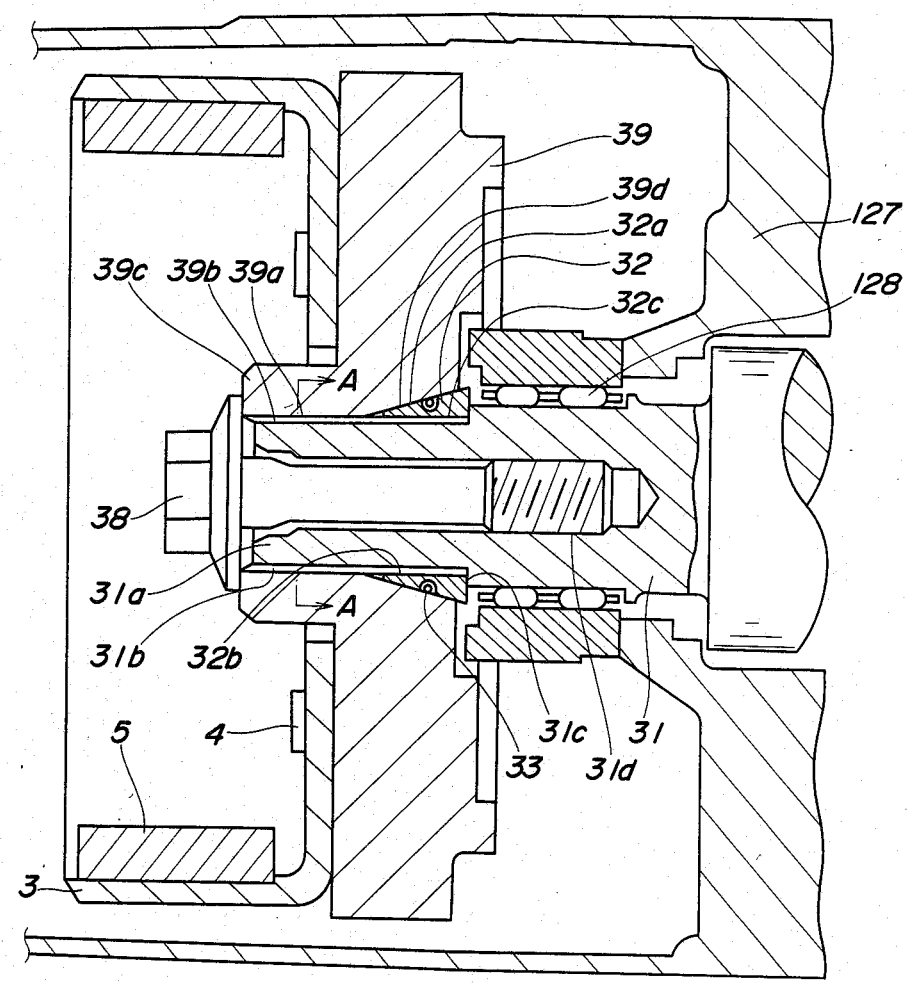
FIG. 6 similar to FIG. 1, but showing a fourth embodiment of the invention.

FIG. 6 shows a still further embodiment of the invention. The overall structure is similar to that shown in FIG. 1. Specifically, crankshaft 31 has one end 31a journaled in bearing housing 127 having roller bearings 128. End 31a of crankshaft 31 includes axially extending teeth 31b on its outer periphery. Flywheel 39 includes bore 39a having teeth 39b therein. Teeth 39b are meshed with teeth 31b of the crankshaft. One end of bore 39a terminates with hub 39c. At its other end is a tapered surface 39d diverging radially toward the open end.

Figure 7:
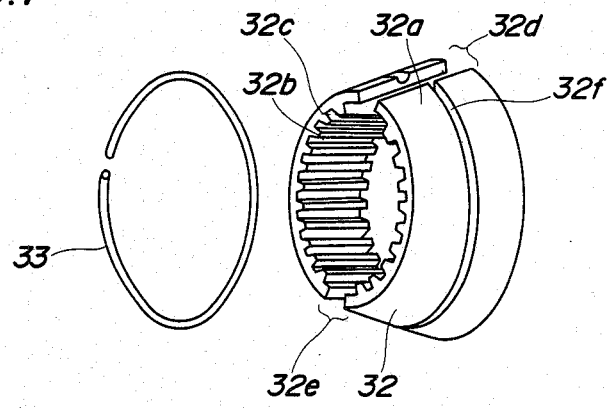
FIG. 7 is a perspective view of a connecting member from the fourth embodiment of the invention shown in FIG. 6.

A connecting member 32 has, as best shown in FIG. 7, a generally truncated conical shape. Its outer peripheral surface is gradually reduced in diameter toward one end of connecting member 32 to form a tapered surface 32a adapted to be brought into engagement with tapered surface 39d of flywheel 39. Connecting member 32 has therein a central bore 32b having formed on an inner circumferential surface thereof teeth 32c in mesh with teeth 31b on crankshaft 31. Connecting member 32 is split at diametrically opposite locations into two or more segments in order to facilitate its radial deformation. A circumferentially extending groove 32f is formed in the outer peripheral surface 32a at a substantially mid portion thereof, and a clip 33 is fitted in groove 32f in order to facilitate assembly. Connecting member 32 is fitted on end 31a of crankshaft 31 to abut against step 31c on the crankshaft. Flywheel 39 is mounted on the crankshaft so that member 32 fits into the tapered open end of bore 39a in flywheel 39. Connecting member 32 and the flywheel 39 are secured to crankshaft 31 by means of a bolt 38 screwed into threaded hole 31d in the crankshaft. The tightening of bolt 38 causes the tapered surface 32a of connecting member 32 to press against tapered surface 39d of flywheel 39. As a result, connecting member 32 is reduced in diameter by the reaction from tapered surface 39d. This causes the teeth 32c on connecting member 32 to be distorted to a position 32c' indicated by the broken line FIG. 2 to, thereby, decrease the circumferential clearance between each tooth 32c on connecting member 32 and the corresponding tooth 31b on crankshaft 31 to substantially zero.

It should be apparent that some play exists between each tooth 39b on flywheel 39 and the corresponding tooth 31b on crankshaft 31 corresponding to the circumferential clearance between the teeth 39b and 31b. Flywheel 39 may consequently tend to be offset from tightly splined connection between connecting member 32 and crankshaft 31 by a play corresponding to the above-mentioned clearance. However, as with the FIG. 4 embodiment, the peripheral contact between tapered surface 32a and tapered surface 39d as connecting member 32 is wedged in place by bolt 38 serves as a brake to absorb shock due to play between the flywheel and the crankshaft.

Although preferred embodiments of the invention have been disclosed in detail above, various modifications should be readily apparent. All such modifications are intended to, and do, fall within the scope of the invention as defined by the following claims.

I claim:

1. Apparatus including a flywheel and a crankshaft for coupling said flywheel to said crankshaft, comprising:
   a portion on said crankshaft having radially extending teeth thereon and an annular projection formed at one end of said crankshaft, said annular projection having a greater diameter than said crankshaft;
   a coupling mechanism including:
     a radially deformable member with a bore therethrough for receiving a toothed portion of said crankshaft therein;
     said deformable member having teeth within said bore, said teeth of said deformable member being in mesh with said crankshaft teeth;
     said teeth of said crankshaft and said teeth of said deformable member having a clearance therebetween; and
     compressing means forcibly movable relative to and against said deformable member to radially inwardly compress and deform said deformable member and to thereby correspondingly reduce said clearance between said meshed teeth of said deformable member and said crankshaft;
   one of said deformable member and said compressing means being secured to said flywheel;
   said flywheel having a bore therethrough, and a peripheral edge around an inner end of said bore of said flywheel, said annular projection of said crankshaft being fitted in an inner circumferential surface of said peripheral edge around said bore of said flywheel; and
   tightenable means to forcibly press said deformable member and said compressing means relative to and against each other to thereby radially compress and deform said deformable member.

2. The apparatus of claim 1, wherein said compressing means comprises a tapered surface slidably engaging said deformable member as said compressing means and said deformable member are pressed against each other by said tightenable means.

3. The apparatus of claim 2, wherein said deformable member includes a tapered surface slidably engaging said tapered surface of said compressing means, said tapered surfaces being arranged such that said deformable member is compressed and deformed radially inwardly by said compressing means.

4. The apparatus of claim 3, wherein said deformable member is integral with said flywheel and comprises an axially extending deformable hub thereon, said compressing means comprises a cup-shaped member, the tapered surface of said deformable member being on the outer circumference of said hub and the tapered surface of said compressing means being on the inner surface of a wall of said cup-shaped member.

5. The apparatus of claim 4, wherein said wall of said cup-shaped member extends substantially axially of said crankshaft.

6. The apparatus of claim 4, wherein said cup-shaped member is between said hub and said tightenable means.

7. The apparatus of claim 6, wherein said hub includes slits therein to facilitate its deformation.

8. The apparatus of claim 7, wherein said slits extend axially of said crankshaft.

9. The apparatus of claim 3, wherein said tightenable means is coupled to said crankshaft.

10. The apparatus of claim 4, wherein said tightenable means is coupled to said crankshaft.

11. The apparatus of claim 3, wherein said flywheel has a bore having teeth therein, said crankshaft extending through said bore of said flywheel with its teeth in mesh with said teeth of said flywheel, there being a clearance between the teeth of said flywheel and the teeth of said crankshaft.

12. The apparatus of claim 1, wherein said flywheel has a bore having teeth therein, said crankshaft extending through said bore of said flywheel with its teeth in mesh with said teeth of said flywheel, there being a clearance between the teeth of said flywheel and the teeth of said crankshaft.

13. The apparatus of claim 11, wherein:
   said deformable member comprises an element having an outer circumferential surface and having its tapered surface on its said outer circumferential surface; and said compressing means is integral with said flywheel and has its tapered surface on an inner surface of said bore in said flywheel.

14. The apparatus of claim 3, wherein:

said deformable member comprises an element having an outer circumferential surface and having its tapered surface on its said outer circumferential surface; and said compressing means is integral with said flywheel and has its tapered surface on an inner surface of a bore in said flywheel.

15. The apparatus of claim 14, wherein said deformable member is pressed between said flywheel and said tightenable means.

16. The apparatus of claim 15, wherein said tightenable means is coupled to said crankshaft.

17. The apparatus of claim 13, wherein:

said crankshaft has a step thereon;

said deformable member is pressed between said flywheel and said step on said crankshaft; and said flywheel is between said tightenable means and said deformable member.

18. The apparatus of claim 17, wherein said tightenable means is coupled to said crankshaft.

19. The apparatus of claim 17, wherein said deformable member comprises at least two portions having a circumferential slot therein, and a clip accommodated in said slot.

20. The apparatus of claim 1, wherein said tightenable means is coupled to said crankshaft.

21. The apparatus of claim 20, wherein said tightenable means comprises a bolt threadably coupled to said crankshaft.

* * * * *